Nov. 12, 1957            C. G. HAWKS            2,812,704

AUTOMATIC POPCORN POPPING AND DISPENSING MACHINE

Filed Jan. 21, 1955                                  4 Sheets-Sheet 1

INVENTOR
CLIO G. HAWKS

BY *McMorrow, Berman + Davidson*
ATTORNEYS

Nov. 12, 1957 C. G. HAWKS 2,812,704
AUTOMATIC POPCORN POPPING AND DISPENSING MACHINE
Filed Jan. 21, 1955 4 Sheets-Sheet 2

INVENTOR
CLIO G. HAWKS

BY McMorrow, Berman + Davidson
ATTORNEYS

Nov. 12, 1957  C. G. HAWKS  2,812,704
AUTOMATIC POPCORN POPPING AND DISPENSING MACHINE
Filed Jan. 21, 1955  4 Sheets-Sheet 3

INVENTOR
CLIO G. HAWKS

BY
McMorrow, Berman + Davidson
ATTORNEYS

Nov. 12, 1957　　　　　　C. G. HAWKS　　　　　2,812,704
AUTOMATIC POPCORN POPPING AND DISPENSING MACHINE
Filed Jan. 21, 1955　　　　　　　　　　　　　　4 Sheets-Sheet 4
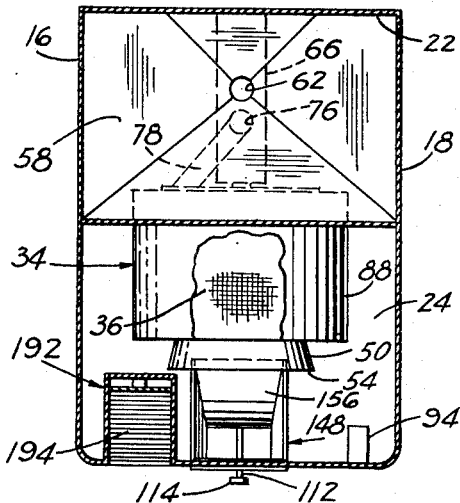
FIG. 7
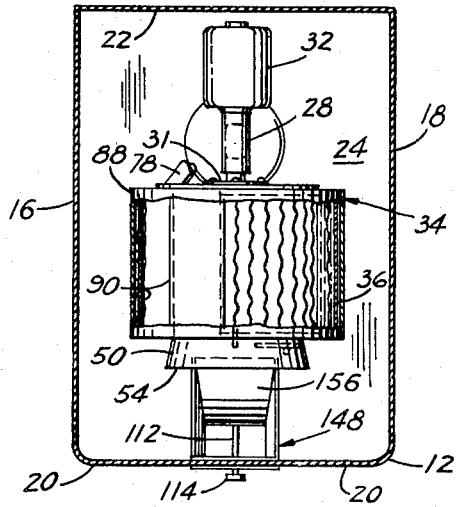
FIG. 8
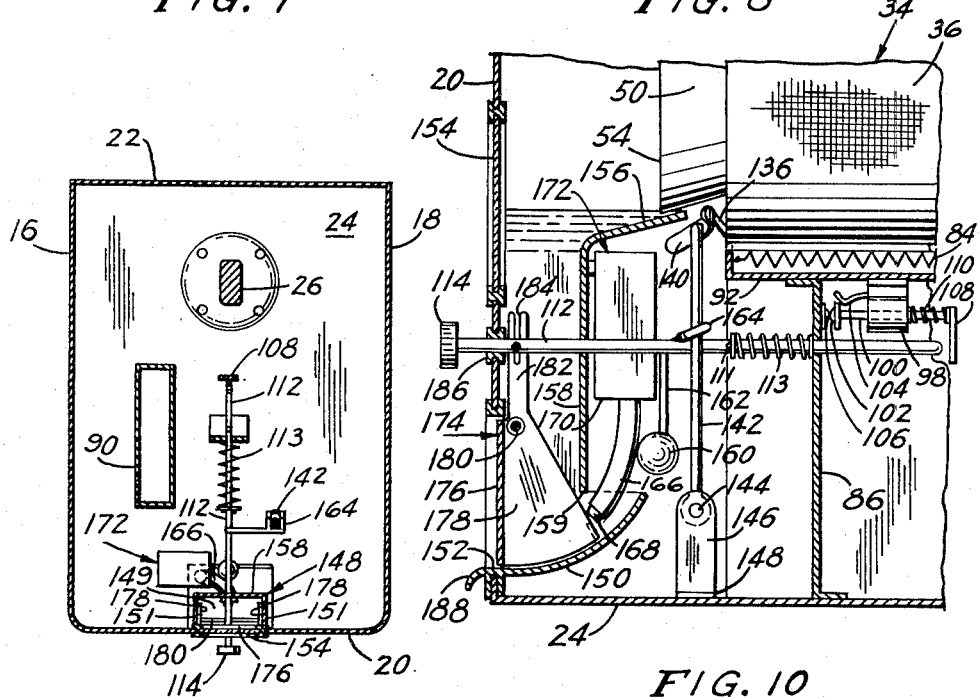
FIG. 9
FIG. 10
INVENTOR
CLIO G. HAWKS
BY
McMorrow, Berman + Davidson
ATTORNEYS United States Patent Office 2,812,704
Patented Nov. 12, 1957

2,812,704

AUTOMATIC POPCORN POPPING AND DISPENSING MACHINE

Clio G. Hawks, Winnebago, Minn.

Application January 21, 1955, Serial No. 483,271

4 Claims. (Cl. 99—238.2)

This invention relates to dispensing machines and more particularly to automatic corn popping and dispensing apparatus of the coin-operated type.

It is an object of this invention to provide an automatic corn popping and dispensing machine which provides a successful coin-operated machine which is efficient in operation and of relatively low cost in production.

It is a further object of this invention to provide a machine of the type indicated which will obviate the possibility of fire hazard common in corn popping apparatus. The fire hazard is prevalent since the popcorn bought by the individual, who initiates the operation and waits until the corn is popped, cannot be expected to wait through a long popping interval, thus, an extreme heating temperature is required to pop the corn in the shortest time interval, and this may result in the accidental ignition of the corn to produce a serious fire hazard.

Another and still further object of this invention is to provide a coin-operated popcorn machine wherein the popped corn may be discharged from the machine by the customer without waiting for the discharge or dumping of the popped corn by the machine which uses predetermined timing mechanisms, which may be electrical or mechanical, to dump the corn only after the predetermined time has elapsed. Thus, the possibility that the corn can either be burned or not all popped within the given predetermined time of the conventional coin-operated corn popping machine due to the necessity for waiting the predetermined time, will be overcome.

Another and further object of this invention is to provide a coin-operated corn popping machine in which the moisture content of the corn kernels will be maintained at as constant a point as possible with the minimum variation in this moisture content to thereby insure uniform popping of the kernels by the machine.

Still another object of this invention is to provide a corn popping machine wherein the unpopped kernels of corn will be subjected to the source of heat at a constant rate until they are popped and maintain the popped kernels out of contact with the source of heat.

Another object of this invention is to provide a machine of the type indicated wherein the corn which has been popped may be seasoned as the popped kernels are discharged from the machine by the action of the customer with all of the seasoning apparatus being maintained within the machine and automatically operative upon the customer's action to cause discharge of the popped corn.

Still another object of the invention is to provide for the escape and discharge of unpopped kernels of corn after the popping cycle, so that there is no accumulation of unpopped kernels in the popping basket to avoid inefficiency of succeeding popping cycles and the possibility of creating a fire hazard.

Another important object of this invention is to provide a corn popping machine wherein the popped and unpopped kernels of corn have a continuous separation during the popping cycle. Thus, the popped kernels will not be subjected to a maximum heat during the popping time to have the quality thereof impaired.

Other objects and advantages will become apparent from a consideration of the following detailed description, forming the specification, and taken in conjunction with the accompanying drawings, in which:

Figure 7 is a horizontal sectional view taken substantially along line 7—7 of Figure 2 and looking in the direction of the arrows;

Figure 8 is a horizontal sectional view taken substantially along line 8—8 of Figure 2 and looking in the direction of the arrows;

Figure 9 is a horizontal sectional view taken substantially along line 9—9 of Figure 2 and looking in the direction of the arrows; and Figure 10 is a fragmentary vertical sectional view through the casing from the front end wall toward the rear end wall.

Figure 1:
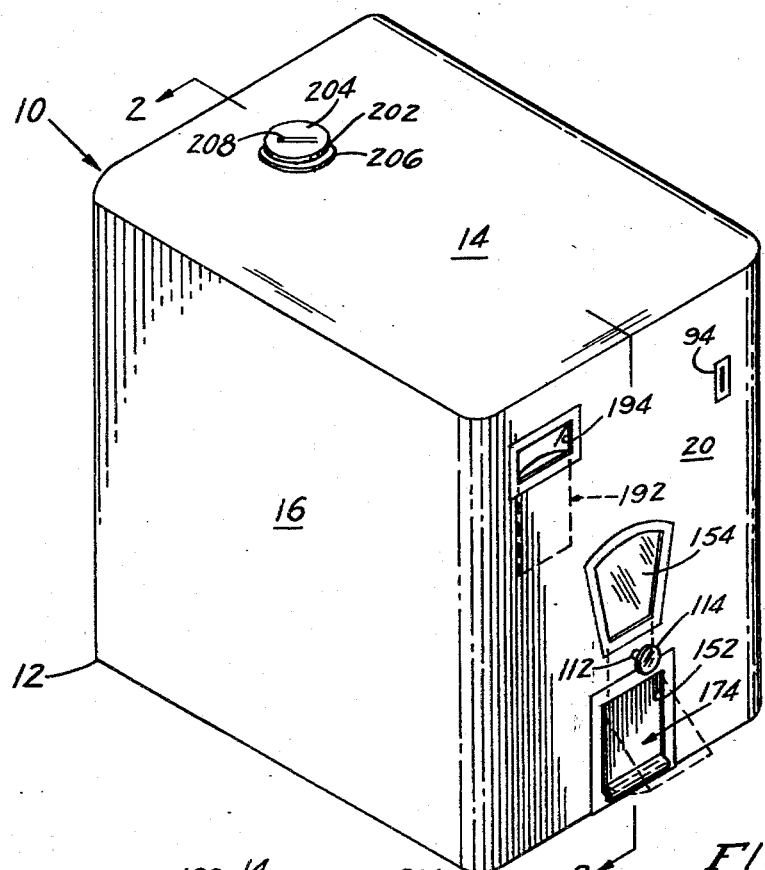
Figure 1 is a perspective view of a popcorn machine embodying this invention.

With continued reference to the drawings, there is shown the corn popping and dispensing machine, generally indicated at 10, which includes a casing 12, which may be suitably formed and configured. The casing includes a top closure 14 which serves as a cover for the open top of the casing walls. The casing walls include spaced side walls 16 and 18 and front and rear end walls 20 and 22 extending between the side walls at opposite ends thereof. A bottom wall 24 extends between the spaced side walls and the spaced apart end walls along the lower edge thereof. The front and rear walls extend between the side walls at respective opposite ends of the side walls.

An upstanding motor shaft bearing pedestal or stand 26 rests on the bottom wall or floor 24 of the casing intermediate the side walls 16 and 18 and adjacent the rear end wall 22. A motor shaft bearing 28 is carried on the top of the pedestal 26 and has its bore extending normally to the vertical center line or axis of the stand. The shaft 30 of a motor 32, preferably of the electric type, is rotatably supported in the bearing 28 and has one end thereof projecting outwardly therefrom to the side thereof remote from the side to which the motor 32 extends.

A corn popping drum, generally indicated at 34 is operatively connected to the motor 32 through the motor shaft 30 so that rotation may be imparted to the drum by the motor.

Figure 4:
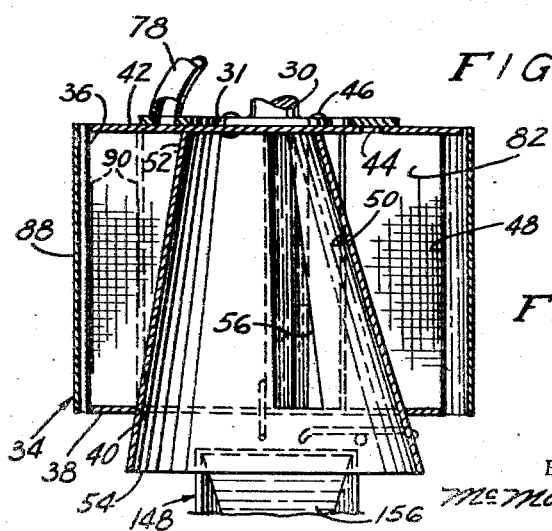
Figure 4 is a cross sectional view taken substantially along line 4—4 of Figure 3.

As shown in Figure 4, the drum 34 comprises an outer cylinder 36 which includes a circular front plate 38 having a rather large central opening 40 transversely therethrough, and a circular rear plate 42 having an arcuate, elongated slot 44 transversely therethrough and spaced from its periphery and generally concentric therewith.

The motor shaft 30 carries at its end remote from the motor 32 a circular attaching flange 31 which is secured to the rear plate 42 as by rivets 46 with the axis of the shaft 30 being coincident with the axis of the drum 34 so that rotation of the shaft 30 will be imparted to the drum 34.

Between the front and rear plates 38 and 42 and extending peripherally thereabout is a wall 48 preferably of copper wire mesh material.

An inner drum member 50 of suitable sheet metal material of generally conical shape, that is the sides of the inner drum member taper evenly from one end thereof to the other, is disposed within the outer cylinder 36 and has the smaller end 52 thereof secured to the rear plate 42 at an off-center location thereon and the larger open end 54 of the inner drum member projecting forwardly of the front plate 38 with the side wall of the drum member extending through the opening 40 in the front plate 38.

Figure 5:
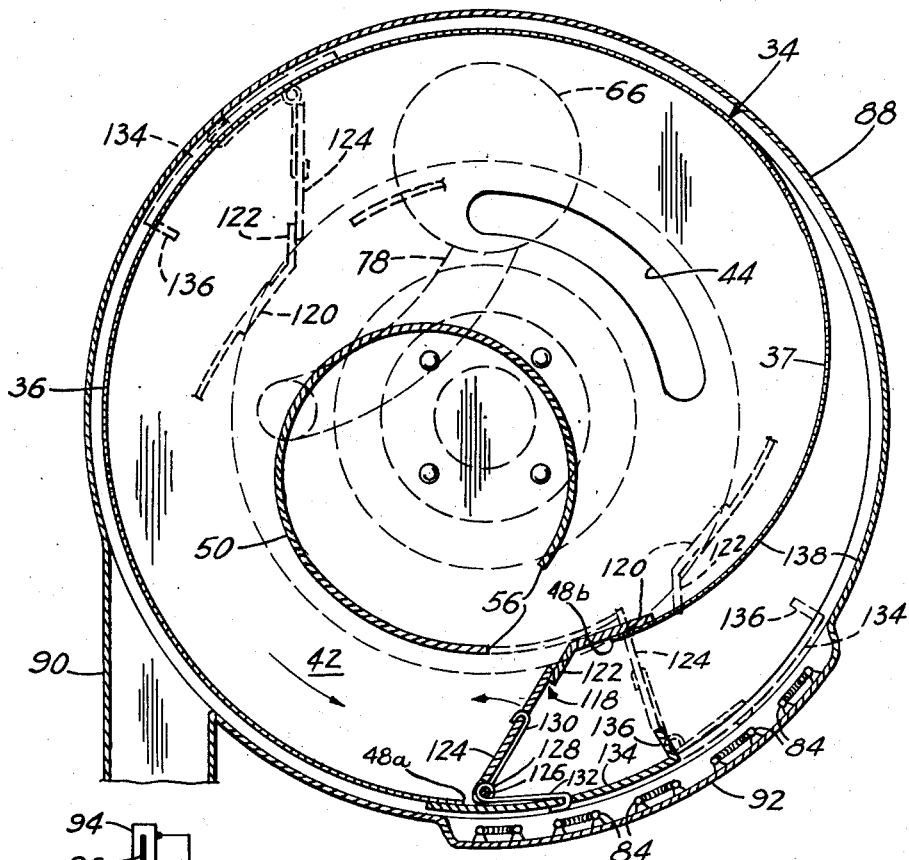
Figure 5 is an enlarged cross sectional view taken substantially along line 5—5 of Figure 2, and looking in the direction of the arrows.

As shown in Figure 5, the generally cone-shaped inner drum member 50 is provided with a longitudinally extending opening 56 in the side wall thereof to define an entrance into the interior thereof. Also, one longitudinal edge of the opening 56 will constitute a scoop surface for picking up popped kernels of corn from the outer cylinder, as will presently appear.

Thus, it will be seen that the inner drum member 50 will be rotated with the outer cylinder 36 and will move in an irregular arcuate path which at one point lies closely adjacent the wire mesh side wall 48 of the outer cylinder.

A hopper 58 for containing a quantity of corn kernels to be popped is carried by the casing 12 adjacent the upper end of the rear end wall 24 and extends between the side walls 16 and 18 within the casing. The hopper 58 has the usual downwardly inclined and converging sides 60 with the discharge opening 62 provided at the convergent ends of the sides 60 to permit gravity feed of the corn kernels placed in the hopper into a measuring cup 64 disposed within a cylinder 66 which may be carried by the lower or funnel end of the hopper and secured at one end to the rear end wall 22 so as to extend within the casing 12 with its longitudinal axis generally parallel to the bottom wall 24.

The measuring cup 64 is mounted within the cylinder 66 for sliding movement longitudinally thereof and urged in one direction, away from the rear wall 22, by a coil spring 68 interposed between the rear wall 22 and the adjoining end of the measuring cup within the cylinder 66.

Figure 2:
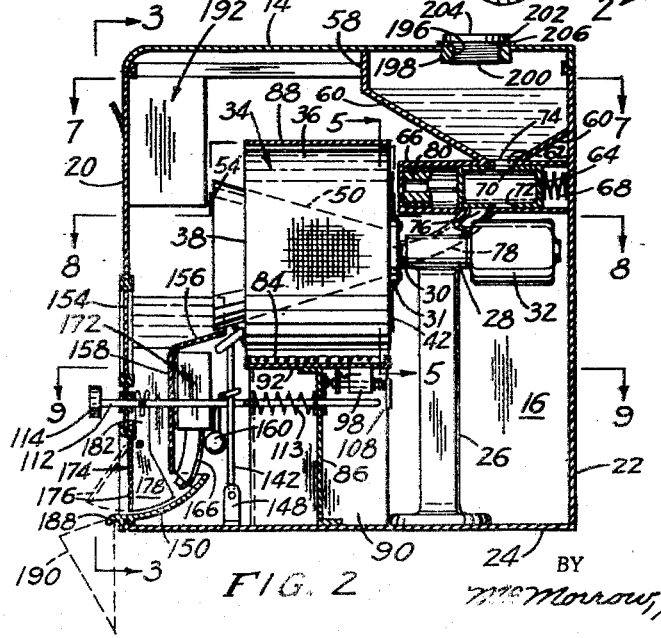
Figure 2 is a longitudinal vertical sectional view, on a reduced scale, taken substantially along line 2—2 of Figure 1.
Figure 3:
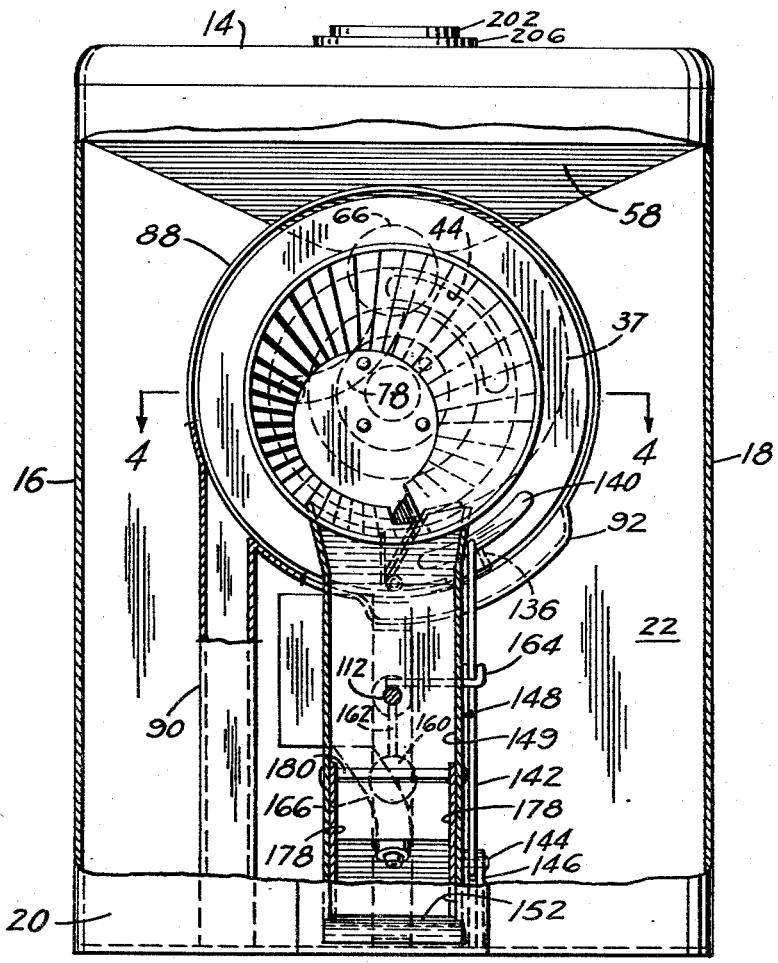
Figure 3 is a front elevational view with portions thereof broken away to show interior constriction and disposition of elements of the machine.

The measuring cup 64 is provided with lined openings 70 and 72 in the top and bottom portions of the measuring cup walls, as clearly shown in Figure 2.

The cylinder 66 is provided with an aperture 74 through one portion of its side wall which aperture is in register with the discharge opening 62 of the hopper. A similar aperture 76 is provided at a diametrically opposite portion of the side wall of the cylinder and at a location out of register with the aperture 70 and disposed in a direction away therefrom and from the rear wall 22. A feed chute 78 has one end thereof secured to the cylinder 66 so as to be in register with the aperture 76 and extends obliquely downwardly therefrom toward the rear plate 42 of the drum 34 with the other end of the feed chute remote from the cylinder 66 riding on the outer surface of the rear plate 42 and adapted to register with the slot 44 upon rotation of the drum.

The solenoid 80 may be actuated to move the measuring cup 64 against the resilient effort of the spring 68 so as to place the opening 70 therein in register with the registering discharge opening 62 and aperture 74 to permit a predetermined quantity of corn kernels to flow by gravity therein from the hopper 58. Upon deactuation of the solenoid 66, the spring 68 will cause the measuring cup to move longitudinally of the cylinder 66 so as to place the opening 72 in the cup in register with the aperture 76 the cylinder to thereby discharge the predetermined amount of corn kernels therein into the feed chute 78. The kernels will then flow through the feed chute and through the inlet feed slot 44 so that the kernels will enter the drum 34 in the popping chamber 82 defined by the space between the inner surface of the wire mesh side wall 48 and the side wall of the inner drum member 50 since the slot 44 is disposed in the rear plate 42 at a location spaced from the outer surface of the side wall of the inner drum member at the smaller end 52 thereof, as clearly shown in Figure 4.

A heating unit 84, of the electrical resistance type, is carried at the upper end of an upstanding bracket or stand 86, the lower end of which is secured to the floor or bottom wall 24, with the heating unit defining heat producing means disposed within the casing and adjacent the side wall of the outer cylinder in slightly spaced relation thereto at the lower portion thereof, as shown in Figure 2.

It should be noted that the drum 34 revolves within a cylindrical housing 88 made of relatively thin sheet metal material so as to completely enclose the drum. The housing 88 has a tangentially downwardly extending, elongated, rectangular chute 90 for receiving and containing the unpopped corn kernels remaining after operation of the machine. The chute 90 is carried on the bottom wall 24 to be upstanding therefrom and supporting housing 88 within casing 12. The housing 88 is also provided with an outwardly extending embossment 92 which extends longitudinally thereof, defining a housing within which is disposed the heating unit 84 so as to provide a shield to prevent the heat generated by the unit 84 from dissipating outwardly therefrom within the casing 12.

Figure 6:
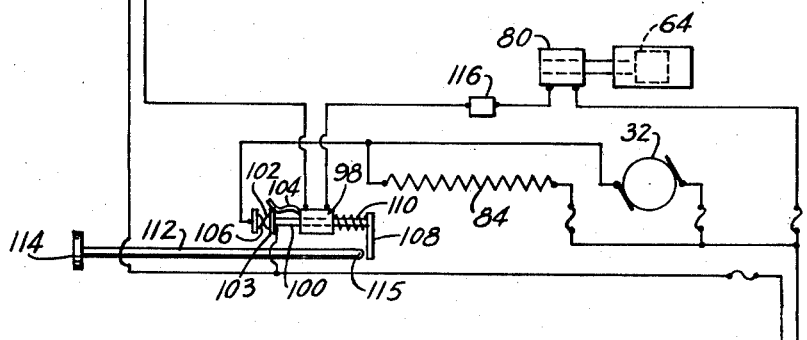
Figure 6 is a diagrammatic view of the electrical wiring arrangement.

With particular reference to Figure 6, a coin receiving mechanism 94 is mounted on the front end wall 20 of the casing and is provided with a coin receiving slot 96 therethrough and a coin controlled switch so that the coin receiving mechanism will cause energization of the circuit upon receiving a coin through the slot, in a well-known manner. A coin box and coin chute may be connected to the coin receiving mechanism or switch 94 in a manner well known in the art to receive the deposited coins within the casing and maintain them within the coin box for later removal.

A solenoid 98 is wired into the circuit and upon energization of the circuit will cause its arm 100 carrying a contact point 102 out of engagement with the spring clip retainer 104, so as to engage a contact point 106.

The contact button or point 106 is wired to the heating unit 84 and to the motor 32 so as to conduct the flow of electric current thereto and start their operation. The arm 100 of the solenoid extends therethrough and has one end thereof extending to either side of the solenoid with the end remote from that end carrying the contact point or button 102 being provided with a contact plate 108 depending therefrom at the free end thereof with a spring 110 encircling that portion of the arm extending to the side of the solenoid 98 remote from the side to which the contact point or button 102 is disposed, with the plate 108 disposed in the rectilinear path of movement of a push rod 112 carried by the front end wall 20 for movement transversely therethrough and carrying a hand knob 114 in its outer end disposed outwardly of the front end wall 20. Thus, to discontinue operation of the machine, it is merely necessary to push the actuating rod 112 inwardly, that is toward the front end wall 20, so that its end 115 disposed within the casing 12 and remote from the end carrying the knob 114 will engage the plate 108 to cause movement of the solenoid arm 100 in a direction away from the contact point of button 106 and have its flange 103 be engaged and resiliently held by the spring retaining clip 104 out of engagement with the contact button 106.

Still referring to Figure 6, it will be seen that the solenoid 80 which operates the measuring cup 64 is also wired into the circuit through the solenoid 98 so as to be energized upon energization of the circuit by insertion of a coin, with the current flowing through a timer switch 116 interposed between the solenoids 98 and 80 whereby the solenoid will be energized for a length of time sufficient for the measuring cup to be moved into position where it receives the corn kernels from the hopper and then have the current discontinued so as to allow the return spring 68 move the measuring cup into its registering position with the feed chute 78 whereby the corn kernels will be introduced into the drum 34.

It is to be noted that the wall 48 of wire mesh material of the outer cylinder 36, Figure 5, has one end 48a adjacent the perimeters of the front and rear plates 38 and 42 and has a portion 37 adjacent the other end curved inwardly from the perimeters of the front and rear plates with the other end 48b adjacent to and spaced inwardly of the one end 48a, the wall end portion 37 of the adjacent part of the housing 88 forming a chamber for unpopped kernels and the space between the wall one and other ends 48a and 48b respectively, forming an escape or entrance 118.

Contrary to the commonly accepted idea that the popcorn and popcorn kernels are all thoroughly mixed up, during the popping cycle, in experimentation during the construction of the present machine, it has been discovered that the heavier popcorn kernels drop down and continue to rest upon the wire mesh inner drum member or screen 48 while the lighter popped corn is on the top of the kernels and therefore may escape therefrom into the interior of the inner drum member 50 through the escape or entrance 118.

It will be noted that the end 48b of the wall 48 of the outer cylinder 36 which is adjacent the opening 56 in the inner drum member carries a stop plate 120 at its end adjacent the opening 56.

The stop plate 120 is provided with an obliquely, laterally extending stop flange 122 extending toward the housing 88 and is adapted to provide a stop for the trap door 124 mounted for movement in an arcuate path about a pivot shaft 126, and resiliently maintained against the stop flange 122 by a spring 128. The spring 128 is coiled about the pivot shaft 126 and has one arm 130 thereof hooked through a suitable opening in the trap door intermediate its ends, while the other arm 132 of the spring is hooked through and secured in a slidable trap door actuating member 134 intermediate the ends of the member so that the trap door is resiliently held in place against the stop flange 122 by action of the spring 128. The slide member 134 is arranged for sliding movement relative to the outer cylinder 36 and is provided at one end remote from the spring 128 with an inwardly directed, integrally formed, abutment ear 136 extending toward the stop plate 120.

Thus, there is provided between the arcuate inwardly directed extension 37 and the housing 88 a chamber 138 closed at one end by the escape 118 which extends between the end of the outer cylinder extension 37 and the opposite free end of the outer cylinder adjacent and concentrically arranged with respect to the housing 88.

A trap door operating shoe 140 is carried at the upper end of a rod 142 which is pivotally mounted at its lower end, as at 144, upon the upstanding leg 146 of an L-shaped bracket 148 which has its other leg secured upon the bottom wall 24 of the casing. The rod 142 is secured intermediate its ends to the push rod 112 so that upon inward movement of the push rod, the rod 142 will be moved about its pivot 144 and move the shoe 140 into the path of the trip ear 136 which will then cause the slide member 134 to move and open the trap door 124 against the effort of the spring 128. This will permit entrance of the unpopped kernels into the chamber 138 while the trap door 124 is open, and when the ear 136 rides off the end of the engaging shoe 140, the trap door will then be closed under the influence of the spring 128 to once again assume the position shown in full lines in Figure 5. As the drum 34 is further rotated, the unpopped kernels will be carried along therewith and against the trap door 124 to the position shown in broken lines in Figure 5 above the chute 90, whereupon the unpopped kernels will drop through the chute and be removed from the drum and housing so that they will no longer be subjected to further heating, and will not be discharged through the larger open end 54 of the metal inner drum member 50 and ultimately to the customer.

Within the casing 12 and adjacent the larger open end 54 there is provided a popped corn receiving housing, generally indicated at 148 having an open top and an arcuately formed bottom wall 150 extending through the lower end of a discharge opening 152 in the front end wall 20 adjacent the lower end thereof. Immediately above the push rod 112, which is disposed above the discharge opening 152, there is provided in the front end wall 20 an inspection window 150 so that the popped corn in the housing 148 can be observed by the customer, as well as the popped corn emerging from the larger end 54 of the inner drum member will be visible therethrough as they are directed into the chamber 149 defined by the housing 148, and directed thereinto by an inclined ramp 156 formed as an upwardly and rearwardly extending plate of the rear wall 158 of the housing 148. The free edge of the ramp 156, remote from the rear wall 158, is disposed beneath and slightly inwardly of the larger open end 54, as clearly shown in Figure 10.

After the maximum amount of kernels of corn in the drum 36 have been popped, and the popped corn deposited in the chamber 149, the customer will then press the knob 114 and push the rod 112 inwardly with respect to the front end wall 20 of the casing so as to discontinue operation of the machine, in the manner hereinbefore described, and at the same time cause the trap door 124 to be opened permitting the unpopped corn to enter the chamber 138. Also, as the rod 142 is moved about its pivot 144 by the inward movement of the rod 112 in its rectilinear path transversely of the casing, a ball 160 dependingly carried upon the rod 142 in spaced relation thereto by a hanger rod 162 by a ring 164 encircling the rod 142 and maintained thereon by engagement with the push rod 112. As the rod 142 is pivoted, it will cause the ball 160 to bear against a rubber discharge tube 166 having discharge nozzle 168 at its lower end, and is dependingly carried from the bottom wall 170 of a closed container, generally indicated at 172 which is removably secured upon the rear surface of the back wall 158, so that the seasoning oils, properly salted, will be squirted from the discharge tube 166 through the ejection nozzle 168 onto the popped corn in the chamber 149. It will be noted that the back wall 158 of the chamber 149 is provided with an opening 159 through which the nozzle end of the discharge tube may project into the chamber adjacent the arcuate floor 150 thereof.

A popcorn discharge door, generally indicated at 174, is disposed with its base 176 in normal closing relation to the discharge opening 152, as shown in Figures 2 and 10, and has the spaced, parallel inwardly extending side flanges 178 disposed at opposite sides of the base and pivotally mounted upon a cross rod 180 secured at its opposite ends in the opposite side walls 151 of the housing 148. Each of the flanges 178 are provided with coplanar and upwardly longitudinally extending yokes 182 provided with a longitudinally extending slot 184 at their upper ends and opening to the terminal ends thereof so as to have the cross pin 186 extending transversely through the rod 112 to be received in the aligned slots 184 in each of the yokes 182. Therefore, as the push rod 112 is moved inwardly with respect to the front end wall 20 of the casing, the discharge door 174 will be moved about its pivot 180 to assume the broken line position shown in Figure 2 and permit the popped corn to fall out of the chamber 149 since the base 176 will be moved into opening relation with respect to the discharge opening 152. The popped corn will fall from the arcuate floor 150 down over a downwardly turned lip 188 of the floor 150 extending outwardly of the front end wall 20, and into a bag 190, which has been opened and has one edge thereof engaged under and behind the lip 188.

A bag receptacle, generally indicated at 192 is carried by the front end wall 20 adjacent the top wall 14 and side wall 16. The bags 194 in the receptacle 192 are removable therefrom through a bag extracting opening 194 transversely through the front end wall 20.

With respect to the hopper 58, the top wall or closure member 14 defines the upper cover for the hopper, and is provided with an internally threaded opening 196 transversely through a depending boss 198 to threadingly receive the externally threaded shank 200 of a plug 202 having its circular head 204 bearing against a resilient seal washer 206. Since the opening 196 opens into the hopper 58, it will be apparent that the hopper may be readily refilled from time to time, and with the plug or cap 202 tightly screwed onto the closure member 14 with the seal washer between the head 204 and the upper surface of the closure member, an air-tight seal will be effected so as to keep the corn kernels to be popped in a fresh condition in the hopper.

The head 204 of the plug is provided with a closed slot 208 opening to the top thereof for the reception therein of the driving bit of the tool to facilitate tightening and removal of the plug from the closure member 14.

While there is shown and described the preferred embodiment of the invention, it is to be understood that the structure is susceptible to change and modification within the practicability of the invention and therefore should be limited only by the scope of the claims appended hereto.

What is claimed is:

1. A coin operated corn popping machine comprising a closed casing including a front wall, a revolvable corn popping drum mounted for rotation within said housing and including an outer cylinder of wire mesh and a hollow conical inner drum member formed as an extension of said outer cylinder having its larger end projecting beyond said outer cylinder at one end thereof adjacent said front wall through which corn popped in said drum can be discharged, an electric motor supported in said casing and operatively connected to said drum for imparting rotation thereto, means for depositing a predetermined amount of corn kernels in said outer cylinder, an electrical heating unit defining a source of heat disposed adjacent said outer cylinder for causing the kernels to pop, and discharge means in said front wall whereby the lighter popped corn discharged from said inner drum member can be discharged from said casing, an electrical circuit connected to a source of electrical energy and in which said heating unit and said motor are connected, said circuit being operable upon deposit of a coin in said machine, a push rod extending transversely of said casing and through said front wall for movement in a rectilinear path within said casing, means in said circuit in the path of movement of said rod for discontinuing circuit operation and operation of said motor and said heating unit when engaged by said rod as it is moved in one direction in its rectilinear path, a discharge door normally disposed in closing relation to said discharge means and operatively connected to said push rod to move away from said discharge means as said rod is moved in said one direction, a popped corn containing housing carried by said front wall having an open top disposed adjacent and below said larger end of the inner drum member to receive and hold popped corn discharged from said inner drum member, said discharge door being mounted in said popped corn containing housing for movement in an arcuate path from a closed to an open position relative to said discharge means, a container having liquid seasoning therein carried by said popped corn containing housing, a seasoning discharge means carried by said container and projecting into said last-mentioned housing, means carried by said escape operating means and operatively connected to said push rod for pivotal movement upon movement of the push rod in said one direction to contact said seasoning discharge means to have seasoning sprayed upon the popped corn in said housing.

2. In a coin operated corn popping machine, a cylinder housing, a corn popping drum positioned within said housing and mounted for rotation within said housing, said drum comprising an outer cylinder and an inner open ended conical shaped drum, said cylinder including a front plate, a rear plate, and a wall of wire mesh material between and secured to the front and rear plates, the wall having one end adjacent to the perimeters of said front and rear plates and having a portion adjacent the other end and curved inwardly from the perimeters of the front and rear plates with the other end adjacent to and spaced inwardly of said one end, said wall other end portion with the adjacent part of said housing forming a chamber for unpopped kernels and the space between said wall one and other ends forming an entrance to said chamber, said inner drum member being disposed within said cylinder and spaced from the wire mesh wall of said cylinder and having the smaller end secured at an off-center location to said cylinder rear plate and having the larger end projecting forwardly from the cylinder front wall, the space defined by said cylinder wire mesh wall, said cylinder front and rear walls and the adjacent portion of said drum forming a kernel popping chamber, there being an opening in said drum extending from the smaller end to a point adjacent said cylinder front plate and providing an entrance into the interior of said drum member for egress therethrough of the popped kernels, a source of heat disposed between said housing and said outer cylinder for causing the kernels to pop, and a trapdoor normally closing the entrance to said chamber for unpopped kernels and swingable to an open position responsive to rotation of said drum.

3. The corn popping machine according to claim 2 which includes in addition spring means operatively connected to said trapdoor for urging said door in its closing position.

4. The corn popping machine according to claim 2 which includes in addition a feed chute having one end in registry with the slot formed in said cylinder rear plate for introducing kernels to be popped into said popping chamber, and a discharge chute on said housing for the discharge of unpopped kernels from said chamber for unpopped kernels.

References Cited in the file of this patent

UNITED STATES PATENTS

| | | |
|---|---|---|
| 841,969 | Hodge | Jan. 22, 1907 |
| 1,182,075 | Bullis | May 9, 1916 |
| 2,113,091 | Mills | Apr. 5, 1938 |
| 2,630,058 | Hawks | Mar. 3, 1953 |